United States Patent [19]

King

[11] Patent Number: 5,996,536
[45] Date of Patent: Dec. 7, 1999

[54] BIRD CAGE

[76] Inventor: Richard King, 105 West La., Sayville, N.Y. 11782

[21] Appl. No.: 08/950,120

[22] Filed: Oct. 14, 1997

[51] Int. Cl.⁶ .................................................. A01K 31/06
[52] U.S. Cl. ............................................................ 119/459
[58] Field of Search ................................... 119/459, 461, 119/462, 463, 474

[56] References Cited

U.S. PATENT DOCUMENTS

| 1,662,687 | 3/1928 | Tullis | 119/463 |
| 4,572,107 | 2/1986 | Clarizo . | |
| 5,000,121 | 3/1991 | Daily | 119/461 |

FOREIGN PATENT DOCUMENTS

| 1225142 | 6/1960 | France | 119/463 |

OTHER PUBLICATIONS

Kings Cages, LP. Quality for Less Brochure (no date avail).

Primary Examiner—Robert P. Swiatek
Attorney, Agent, or Firm—Galgano & Burke

[57] ABSTRACT

A bird cage which comprises a base, four sides having a lower inverted U-shaped edge member, a top, and a seed catcher which outwardly extends from the sides to catch and direct debris, such as discarded bird seeds, shells, etc., which fall out from the sides. A rectangular-shaped side retainer comprising four horizontal elongated bars connected by four corner mounts is mounted above the seed catcher and releasably attachable to the base to securely support the U-shaped edge members of the sides in a spaced-apart relation to the seed catcher. The attachment of the sides to side retainer provides an unobstructed opening or passageway under the length of the securely supported side for directing discarded bird seed into base.

9 Claims, 4 Drawing Sheets

BIRD CAGE

BACKGROUND OF THE INVENTION

The present invention relates generally to bird cages. More particularly, the present invention relates to readily assembled bird cages having securely supported sides, and preferably, a seed guard or catcher for catching bird seeds, shells, feathers, or other debris which may fall out of the cage.

Bird cages generally include a wire framework having a top, vertical sides, and a bottom for confining one or more birds therein. While discarded bird seeds, shells, feathers, and other debris are typically caught in a bottom tray, some of the debris ultimately falls out of the cage and onto the floor.

FIG. 6 illustrates a prior art bird cage 10 and a seed catcher 20, and particularly, the connection between the sides 12 and a generally rectangular base 14. A lower edge 16 of sides 12 fits into in an upwardly extending U-shaped member 18 of base 14 so that sides 12 are securely supported by base 14 along their entire length. Seed catcher 20 includes an outwardly extending and angled wall 22 and a vertical downwardly depending wall or leg 24. Leg 24 fits into U-shaped member 18 along with lower edge 16 of sides 12. While this configuration provides a sturdy assembled bird cage due to sides 12 being supported and restrained from outwardly directed movement along their length, a portion of discarded bird seeds 30 which fall out of bird cage 10 is trapped between seed catcher 20 and sides 12, i.e., bird seeds 30 are prevented from being deposited into base 14, e.g., into a bottom tray (not shown). In particular, bird seeds 30 tend to become wedged into the lowermost portion of angled wall 22 of seed catcher 20 and sides 12, and which once accumulated therebetween, become unsightly and dirty as well as difficult to remove and clean.

Thus, there is a need for a sturdy assembled bird cage desirably having a seed catcher wherein bird seeds, shells, and other debris which fall out of the cage are readily directed into the base or bottom tray.

SUMMARY OF THE INVENTION

It is therefore an object of the present invention to provide a novel bird cage having sides which are securely supported above and spaced-apart from a seed catcher so that discarded bird seeds, shells, and other debris which fall out of the cage can be readily deflected into a bottom tray of the bird cage.

It is another object of the present invention to provide such a bird cage having a seed catcher which is configured so that discarded bird seeds, shells, and other debris which fall out of the bird cage are prevented from becoming trapped and wedged between the sides of the bird cage and the seed catcher.

It is also an object of the present invention to provide such a bird cage which is economically manufactured for widespread sale and use for confining one or more birds in a clean and attractive manner.

Certain of the foregoing and related objects are readily obtained in a bird cage comprising a base, a side retainer supportable above and spaced-apart from the base, at least one side having a lower edge comprising an inverted U-shaped member supportable on the side retainer, and a top attachable to the sides. Preferably, the bird cage further comprises a seed catcher supportable below the side retainer so as to define a passageway between the seed catcher and the side retainer. The seed catcher outwardly extends from the at least one side so that debris falling outwardly from the at least one side is directed by the seed catcher through the passageway and into the base.

Also preferably, the bird cage further comprises means for connecting the base to the side retainer. Desirably, the means for connecting the base to the side retainer comprises the base having a plurality of posts and the side retainer comprising a plurality of mounts, each of which comprises a bore disposed in alignment with and in which is receivable one of the posts. Advantageously, the seed catcher comprises a plurality of apertures extending therethrough and disposed in alignment with the means for connecting the base to the side retainer.

Desirably, the side retainer comprises at least one elongated horizontally extending bar which supports the at least one side. Preferably, the inverted U-shaped member extends along a portion of the lower edge of the at least one side, and desirably, along substantially the entire length of the lower edge of the at least one side. Advantageously, the base comprises a slidable tray, a slidable grate, and four legs.

BRIEF DESCRIPTION OF THE DRAWINGS

These and other objects and advantages of the present invention will become apparent from the following description of the accompanying drawings, which disclose one embodiment of the present invention. It is to be understood that the drawings are to be used for purposes of illustrations only, and not as a definition of the invention.

In the drawings, wherein similar reference numerals denote similar elements throughout the several views.

DETAILED DESCRIPTION OF A PREFERRED EMBODIMENT

Figure 1:
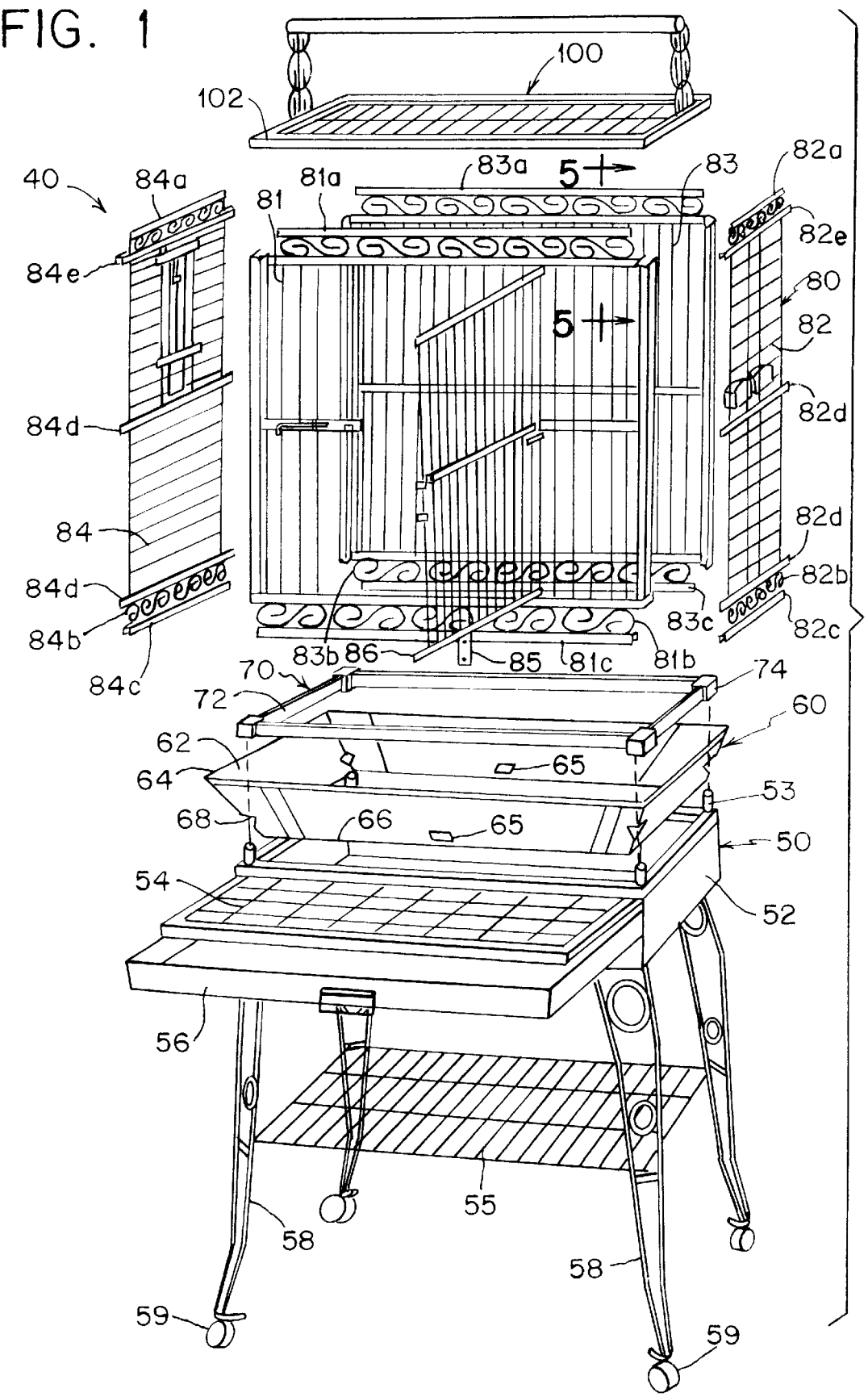
FIG. 1 an exploded perspective view of a bird cage according to the present invention.

Turning now to the drawings, therein illustrated in FIG. 1 is one embodiment of a novel bird cage 40 according to the present invention. In this illustrated embodiment, bird cage 40 includes a generally rectangular base 50, four vertical sides 80, and a generally rectangular top 100 which when assembled, define a generally rectangular enclosure for confining one or more birds. Preferably, for large birds, the enclosure typically ranges in size, e.g., from about two feet by two feet, to about three feet by four feet and about two to three feet high. Preferably, a seed catcher 60 laterally extends from sides 80 to catch debris, such as discarded bird seeds, shells, etc. which may fall out of the cage, and to direct the debris into base 50. As described in greater detail hereinafter, the connection between sides 80 and base 50 is such that the lower edges of sides 80 are securely supported while being spaced-apart from base 50, and desirably spaced-apart from seed catcher 60 thereby not obstructing discarded debris which fall out of the cage as the debris is directed by seed catcher 60 into base 50 for containment in a bottom tray 56.

Base 50 includes a rectangular frame 52 closed on three sides having an open front side which has a slidable, removable or pullout bottom grate 54 and removable or pullout tray 56 for collecting discarded bird seed, shells, feathers, and other debris. Four upwardly extending pins or posts 53 are attached to the top of frame 52 at its corners and four legs 58 are attached to the bottom of frame 52 also at its corners. Desirably, a roller or caster 59 is attached to the bottom of each leg 58. Advantageously, a shelf 55 is supported midway between the top and bottom of legs 58 for holding various accessories.

Figure 2:
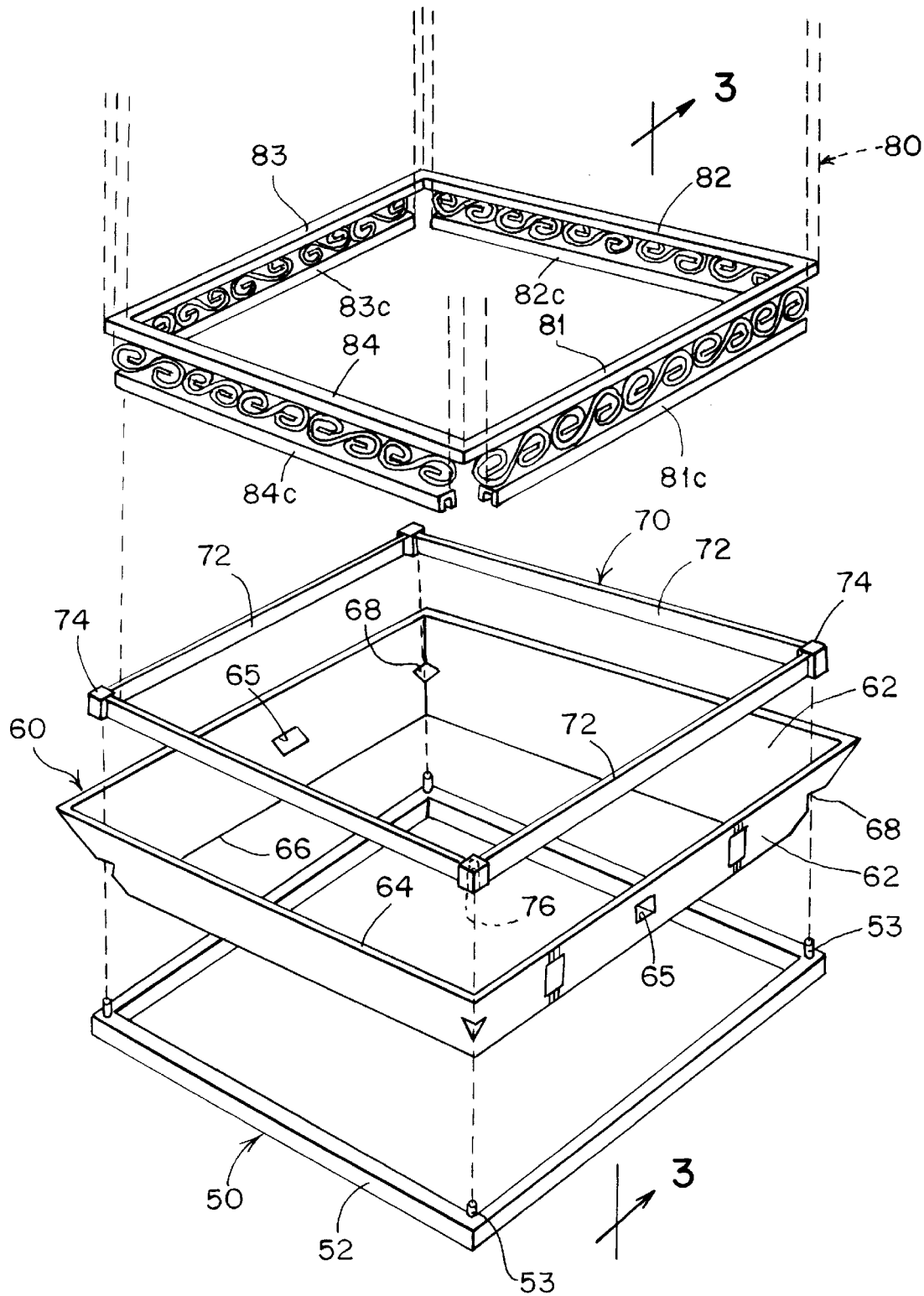
FIG. 2 is an enlarged, exploded, perspective view of a portion of the sides, side retainer, seed catcher, and a portion of the base, shown in FIG. 1.

With reference to FIGS. 1 and 2, generally funnel-shaped seed catcher 60 is supportable above and on frame 52 of base 50. In this illustrated embodiment, seed catcher 60 is rectangular-shaped and includes an upwardly and outwardly flared or angled sidewall 62 having an upper peripheral edge 64 defining an opening which extends outwardly from frame 52, as well as which extends outwardly from the sides, and an inner peripheral edge 66 defining an opening disposed within frame 52. Extending through sidewall 62 are four cut-outs or apertures 68 which are positioned at the corners of seed catcher 60 between upper peripheral edge 64 and inner peripheral edge 66. Apertures 68 correspond and align with posts 53 so that seed catcher 60 can be readily slid over posts 53 and rested on the upper edge of frame 52. Desirably, seed catcher 60 is formed from a plurality of segments which are suitably connected together.

Positioned above seed catcher 60 is a rectangular-shaped side retainer 70 comprising four horizontal elongated bars 72 connected by four corner mounts 74. Each mount 74 has a downwardly extending opening or bore 76 (shown in dashed lines in FIG. 2) which is disposed in alignment with one of posts 53 to allow side retainer 70 to rest directly on posts 53.

Sides 80 comprises a front side 81, a right side 82, a rear side 83, and a left side 84. Desirably, front side 81 has a hingedly mounted door 86 (FIG. 1). Sides 81, 82, 83, and 84 have respective top edges 81a, 82a, 83a, and 84a (FIG. 1) and respective lower edges 81b, 82b, 83b, and 84b. The respective lower edges have an inverted U-shaped bar or member 81c, 82c, 83c, and 84c, each of which rests on one elongated bar 72 of side retainer 70. Once sides 80 are positioned in place, two straps 85 (only one of which is shown in FIG. 1) can be inserted through respective apertures 65 in seed catcher 60 to securely fasten both front side 81 and rear side 83 to base 50. Desirably, sides 80 include decorative scrollwork and vertical and horizontal spaced-apart bars or wires which are attached, e.g., welded together.

Figure 3:
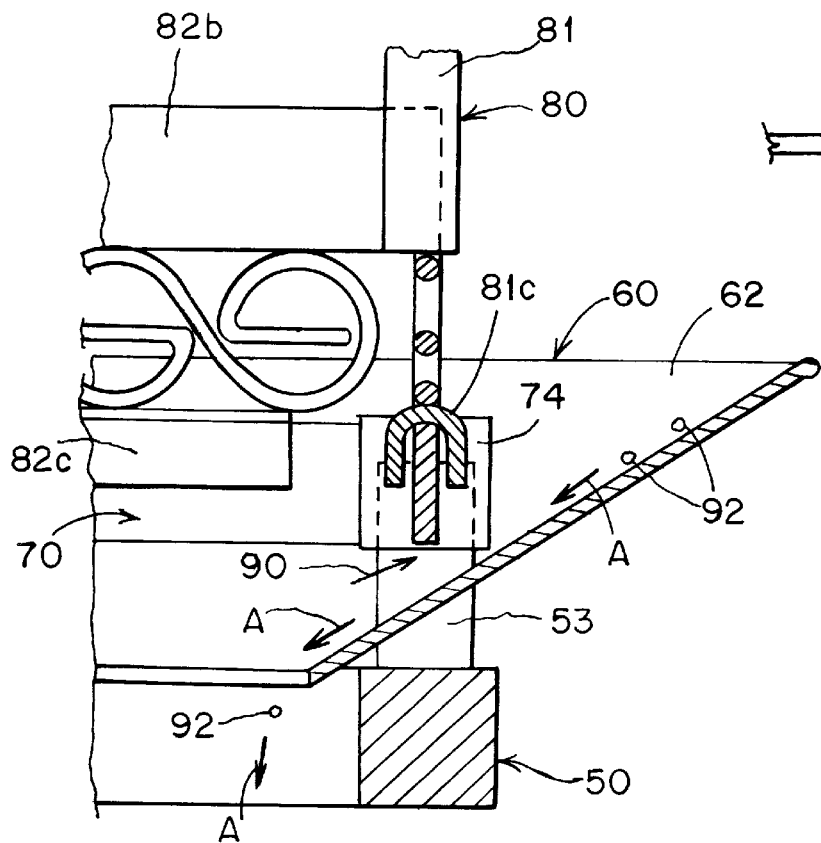
FIG. 3 is an enlarged, cross-sectional view taken along lines 3—3 in FIG. 2 illustrating the connection between the sides and the base.
Figure 4:
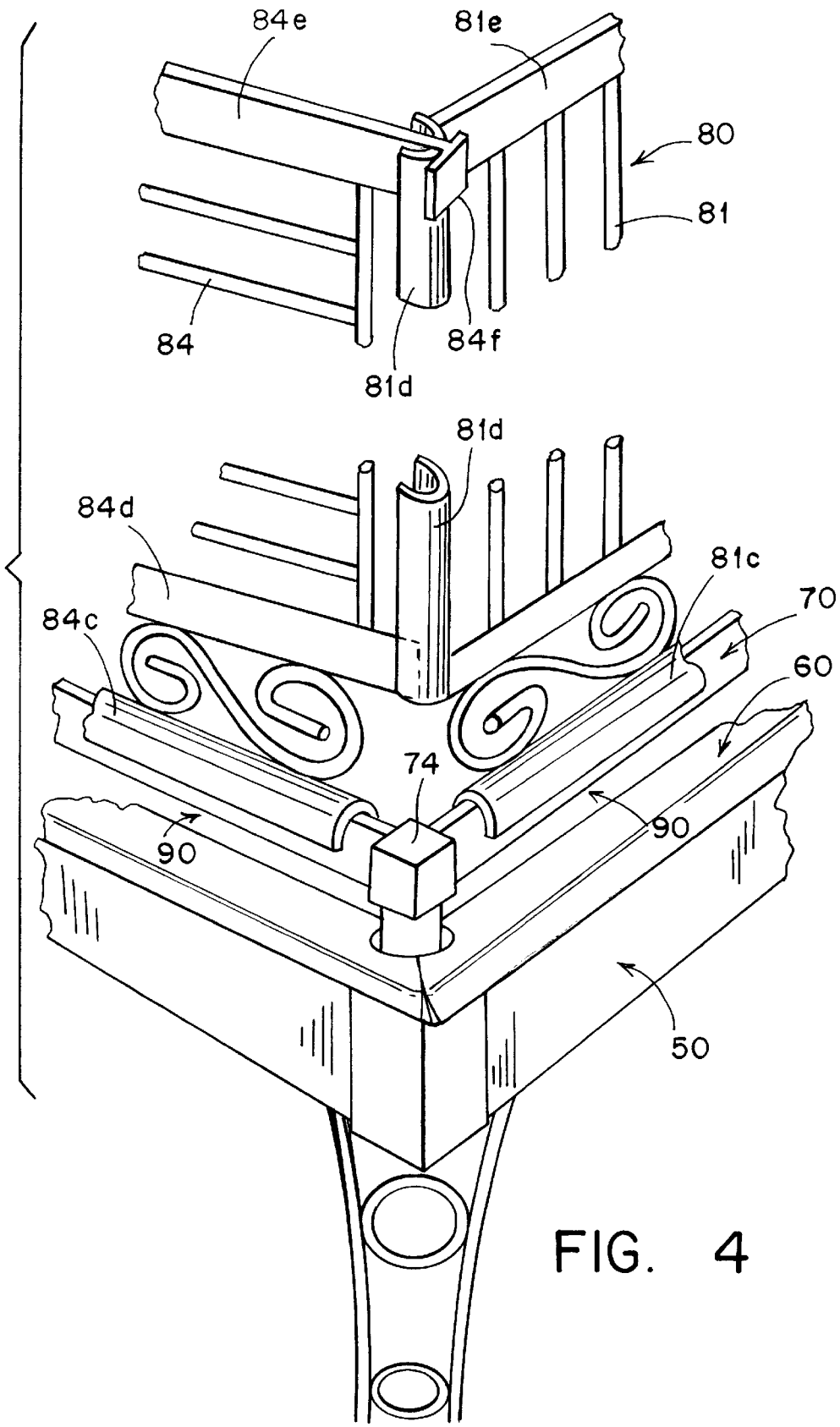
FIG. 4 is a perspective view of the left and front side, upper and lower corners of the bird cage shown in FIG. 1.

As shown in FIGS. 3 and 4, the novel configuration of the attachment of sides 80 to side retainer 70 provides an unobstructed opening or passageway 90 under the length of the sides and above seed catcher 60 for directing discarded bird seed 92 (FIG. 3) and other debris in the direction of arrows A (FIG. 3) and into base 50.

Figure 5:
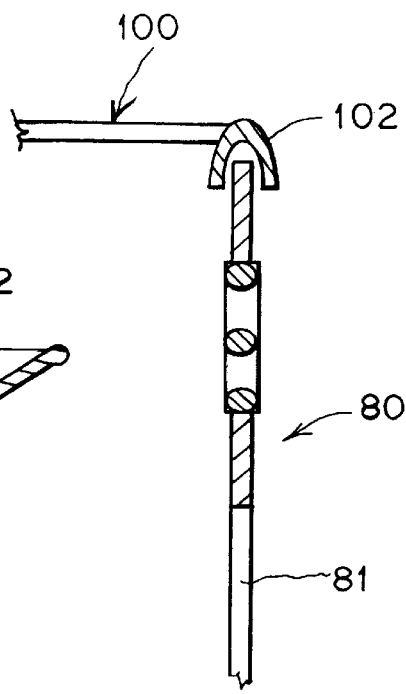
FIG. 5 is an enlarged, cross-sectional view taken along lines 5—5 in FIG. 1 illustrating the connection between the sides and the top.
Figure 6:
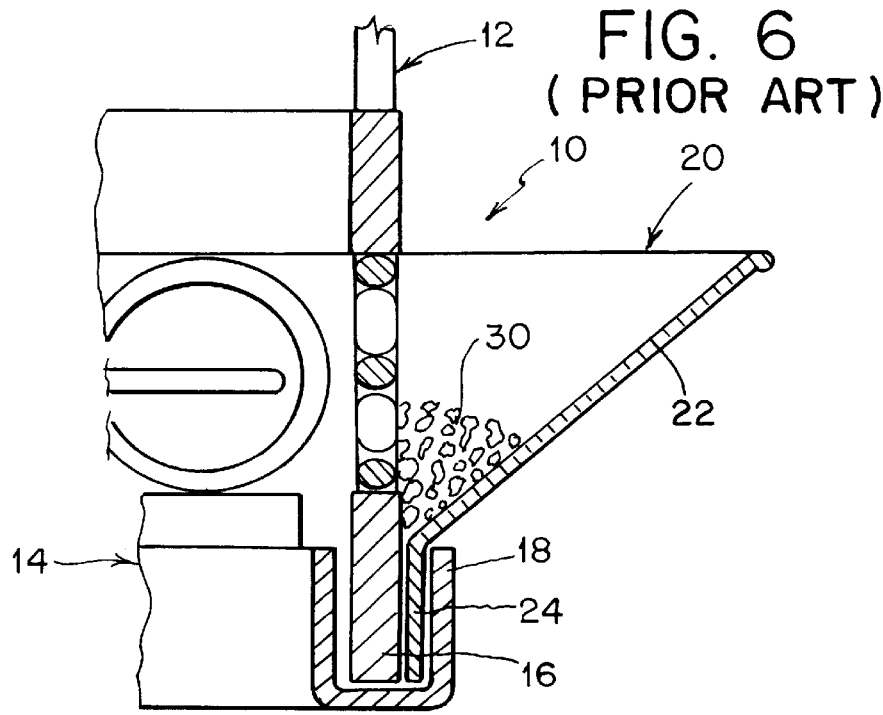
FIG. 6 is a cross-sectional view similar to FIG. 3 of a prior art bird cage and seed catcher.

Preferably, as best seen in FIG. 5, top 100 has a peripheral outer edge comprising a downwardly depending U-shaped member 102 into which is received the upper edge of sides 80. Advantageously, the upper and lower edges of sides 80 are securely held in place and prevented from outwardly directed movement by top 100 and retainer 70 (FIG. 2). In addition, with reference to FIGS. 1 and 4, the vertical edges of sides 80 interlock with each other. As best seen in FIG. 4, front side 81 is provided with vertically extending U-shaped members 81d (only one of which is shown in FIG. 2) in which the open ends of respective U-shaped members 81d face left side 84 and right side 82. Rear side 83 (FIG. 1) is similarly provided with vertically extending U-shaped members. Left side 84 (and similarly right side 82) is provided with two horizontally extending straps 84d (only one of which is shown in FIG. 4) having ends thereof which fit within the open ends of the vertically extending U-shaped members of the front and rear sides. A top horizontally extending strap 84e of side 84 is provided with front and rear tabs 84f (only the front tab shown in FIG. 4) so that strap 84f extends through a cutout in vertically-extending U-shaped member 81d and is restrained by tabs 84f.

From the present description, it will be appreciated to those skilled in the art that the inverted U-shaped members of the sides of the bird cage can extend along a portion of the length of the lower edge, consist of a series of segments, or extend completely along the length of the lower edge of the side.

Thus, while one embodiment of the present invention has been illustrated and described, it will be appreciated to those skilled in the art that many changes and modifications may be made thereunto without departing from the spirit and scope of the invention.

What is claimed is:

1. A bird cage, comprising:

a base;

a side retainer supportable above and spaced-apart from said base;

a plurality of sides, each having a lower edge, said lower edge comprising an inverted U-shaped member supportable on said side retainer; and a top attachable to said sides.

2. The bird cage according to claim 1, further comprising a seed catcher supportable below said retainer so as to define a passageway between said seed catcher and said side retainer, said seed catcher outwardly extending from said at least one side so that debris falling outwardly from said at least one side is directed by said seed catcher through said passageway and into said base.

3. The bird cage according to claim 1, further comprising means for connecting said base to said side retainer.

4. The bird cage according to claim 3, wherein said means for connecting said base to said side retainer comprises said base having a plurality of posts and said side retainer comprising a plurality of mounts, each of which comprising a bore disposed in alignment with and in which is receivable one of said posts.

5. The bird cage according to claim 1, further comprising means for connecting said base to said side retainer and wherein said seed catcher comprises a plurality of apertures extending therethrough and disposed in alignment with said means for connecting said base to said side retainer.

6. The bird cage according to claim 1, wherein said side retainer comprises at least one elongated horizontally extending bar which supports said at least one side.

7. The bird cage according to claim 1, wherein said inverted U-shaped member extends along a portion of the lower edge of said at least one side.

8. The bird cage according to claim 7, wherein said inverted U-shaped member extends along substantially the entire length of said lower edge of said at least one side.

9. The bird cage according to claim 1, wherein said base comprises a slidable tray, a slidable grate, and four legs.

* * * * *